US011659216B2

(12) United States Patent
Shi et al.

(10) Patent No.: US 11,659,216 B2
(45) Date of Patent: *May 23, 2023

(54) SYNCHRONIZING AND DYNAMIC CHAINING OF A TRANSPORT LAYER NETWORK SERVICE FOR LIVE CONTENT BROADCASTING

(71) Applicant: AT&T Intellectual Property I, L.P., Atlanta, GA (US)

(72) Inventors: Shu Shi, Summit, NJ (US); Rittwik Jana, Montville, NJ (US); Bo Yan, Brooklyn, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 133 days.

This patent is subject to a terminal disclaimer.

(21) Appl. No.: 17/191,799

(22) Filed: Mar. 4, 2021

(65) Prior Publication Data

US 2021/0195264 A1 Jun. 24, 2021

Related U.S. Application Data

(63) Continuation of application No. 16/356,908, filed on Mar. 18, 2019, now Pat. No. 10,972,776, which is a (Continued)

(51) Int. Cl.
*H04N 21/24* (2011.01)
*H04N 21/242* (2011.01)
(Continued)

(52) U.S. Cl.
CPC .......... *H04N 21/242* (2013.01); *H04L 12/28* (2013.01); *H04L 12/2803* (2013.01);
(Continued)

(58) Field of Classification Search
None
See application file for complete search history.

(56) References Cited

U.S. PATENT DOCUMENTS

| 6,434,622 B1 | 8/2002 | Monteiro et al. |
| 6,473,793 B1 | 10/2002 | Dillon et al. |

(Continued)

FOREIGN PATENT DOCUMENTS

| CN | 102244773 A | 11/2011 |
| CN | 102244773 B | 6/2013 |
| WO | 2016181383 A2 | 11/2016 |

OTHER PUBLICATIONS

Alam, Kazi et al., "VeDi: A vehicular crowdsourced video social network for VANETs", (Section III on pp. 739-741), 2014.
(Continued)

*Primary Examiner* — Cai Y Chen
(74) *Attorney, Agent, or Firm* — Guntin & Gust, PLC; John G. Rauch

(57) ABSTRACT

Aspects of the subject disclosure may include, for example, a processing system of a communication node routing data packets for a first streaming session between a viewer node of a plurality of viewer nodes and a content streaming server through the communication node without interrupting delivery of content data to the viewer node, establishing a second streaming session with the content streaming server to receive the content data, creating a first and second replacement connections by imitating a connections with the content streaming server and the viewer node, receiving a control packet over the second streaming session from the content streaming server, and splitting the first streaming session responsive to receiving the control packet. Other embodiments are disclosed.

20 Claims, 8 Drawing Sheets

Related U.S. Application Data continuation of application No. 15/641,058, filed on Jul. 3, 2017, now Pat. No. 10,271,077.

(51) Int. Cl.

| | |
|---|---|
| *H04N 21/2187* | (2011.01) |
| *H04N 21/845* | (2011.01) |
| *H04N 21/43* | (2011.01) |
| *H04N 21/643* | (2011.01) |
| *H04N 21/442* | (2011.01) |
| *H04L 12/28* | (2006.01) |
| *H04N 21/647* | (2011.01) |
| *H04L 65/1016* | (2022.01) |
| *H04L 65/611* | (2022.01) |
| *H04L 65/75* | (2022.01) |
| *H04L 65/1104* | (2022.01) |

(52) U.S. Cl.
CPC ...... *H04L 65/1016* (2013.01); *H04L 65/1104* (2022.05); *H04L 65/611* (2022.05); *H04L 65/765* (2022.05); *H04N 21/2187* (2013.01); *H04N 21/4302* (2013.01); *H04N 21/44227* (2013.01); *H04N 21/64322* (2013.01); *H04N 21/64746* (2013.01); *H04N 21/8455* (2013.01)

(56) References Cited

U.S. PATENT DOCUMENTS

| | | | |
|---|---|---|---|
| 6,553,413 | B1 | 4/2003 | Leighton et al. |
| 7,143,177 | B1 | 11/2006 | Johnson et al. |
| 7,711,844 | B2 | 5/2010 | Schuehler et al. |
| 8,472,326 | B2 | 6/2013 | Morrill et al. |
| 8,670,313 | B2 | 3/2014 | Ray et al. |
| 9,021,134 | B1 | 4/2015 | Patel |
| 9,112,946 | B2 | 8/2015 | Park et al. |
| 9,531,760 | B2 | 12/2016 | Lajoie et al. |
| 9,584,835 | B2 | 2/2017 | Tremblay |
| 2003/0005455 | A1 | 1/2003 | Bowers |
| 2004/0049596 | A1 | 3/2004 | Schuehler et al. |
| 2007/0008884 | A1 | 1/2007 | Tang et al. |
| 2007/0250636 | A1 | 10/2007 | Stephens et al. |
| 2010/0226444 | A1 | 9/2010 | Thevathasan et al. |
| 2010/0235431 | A1 | 9/2010 | Poluri et al. |
| 2010/0281105 | A1 | 11/2010 | Sebastian |
| 2010/0325287 | A1 | 12/2010 | Jagadeeswaran et al. |
| 2011/0131573 | A1 | 6/2011 | Antony |
| 2012/0110118 | A1 | 5/2012 | Luna et al. |
| 2014/0215267 | A1 | 7/2014 | Hegdal et al. |
| 2014/0344332 | A1 | 11/2014 | Giebler |
| 2015/0295726 | A1 | 10/2015 | Bland |
| 2016/0035034 | A1 | 2/2016 | Mathews |
| 2016/0044115 | A1 | 2/2016 | Hill et al. |
| 2016/0204887 | A1 | 7/2016 | Lee et al. |
| 2016/0227263 | A1 | 8/2016 | Lee |
| 2016/0255129 | A1 | 9/2016 | Walker et al. |
| 2016/0285923 | A1 | 9/2016 | Kodaypak |
| 2016/0301724 | A1 | 10/2016 | Kodaypak |
| 2016/0337426 | A1* | 11/2016 | Shribman ............. H04L 65/612 |
| 2016/0359574 | A1 | 12/2016 | Lee et al. |
| 2016/0359744 | A1 | 12/2016 | Kwak et al. |
| 2017/0111665 | A1 | 4/2017 | Suryanarayanan et al. |
| 2017/0142450 | A1 | 5/2017 | Ghosal et al. |
| 2017/0171264 | A1 | 6/2017 | Salomons |
| 2017/0188054 | A1 | 6/2017 | Ma et al. |
| 2017/0214608 | A1 | 7/2017 | Jilani et al. |
| 2017/0272792 | A1 | 9/2017 | Bachmutsky et al. |
| 2017/0353747 | A1* | 12/2017 | Thomas ........... H04N 21/23418 |
| 2017/0374121 | A1 | 12/2017 | Phillips et al. |
| 2017/0374417 | A1 | 12/2017 | Hernandez-Mondragon |
| 2018/0048730 | A1 | 2/2018 | Knecht et al. |
| 2018/0048731 | A1 | 2/2018 | Yeager et al. |
| 2018/0183658 | A1 | 6/2018 | Fromentoux et al. |
| 2019/0007475 | A1 | 1/2019 | Shi et al. |
| 2019/0007716 | A1 | 1/2019 | Shi et al. |
| 2019/0215548 | A1 | 7/2019 | Shi et al. |
| 2019/0332511 | A1 | 10/2019 | Morgan |

OTHER PUBLICATIONS

Ellerton, John et al., "Prospects for software defined networking and network function virtualization in media and broadcast", (Figures 2-5; pp. 11-17 for applications underway that appropriate existing structures for broadcasting), 2015.

Moore, Derek et al., "Surrogate Joint Aerial Layer Network (JALN) Experiment: Applications of Commercial-Off-The-Shelf Technologies for Researching Future JALN Challenges", (Figures 1-6; pp. 2-9; Section 3.5 on pp. 18-23), 2014.

Osman, Niemah et al., "Energy efficient future high definition TV", (Section II on pp. 2365-2366; Figures 5-6 on pp. 2369-2370)., 2014.

Ponna, Chaitanya, "How Enable Efficient Information Interchanges in Virtual", (Section 6.5; pp. 7374), 2011.

* cited by examiner

100

200

300

SYNCHRONIZING AND DYNAMIC CHAINING OF A TRANSPORT LAYER NETWORK SERVICE FOR LIVE CONTENT BROADCASTING

CROSS-REFERENCE TO RELATED APPLICATIONS

This application is a continuation of U.S. patent application Ser. No. 16/356,908, filed Mar. 18, 2019, pending, which is a continuation of U.S. patent application Ser. No. 15/641,058, filed Jul. 3, 2017, now U.S. Pat. No. 10,271,077. All sections of the aforementioned applications and patents are incorporated herein by reference in their entirety.

FIELD OF THE DISCLOSURE

The subject disclosure relates to a transport layer network service for live content broadcasting.

BACKGROUND

Much effort has been made to deliver live broadcast services over the past decade. In the early days, live content broadcast was built over IP multicast systems. However, as IP multicast faces practical deployment and management issues, it is only used in limited scenarios such as Internet Service Provider (ISP) oriented Internet Protocol Television (IPTV) services.

After the year 2000, P2P-based live broadcasting systems won popularity to share video contents among end-user devices. P2P live streaming systems scale well under dynamic workloads, since each joining user acts as a reflected content source. However, P2P live streaming suffers from unstable video quality and severe latency up to minutes mainly due to peer churn and limited uplink bandwidth. In addition, P2P systems introduce significant user-side complexities and no longer fit the modern requirement of lightweight client implementation. Even though recent effort in augmenting P2P with cloud and content delivery network (CDN) can effectively reduce the latency and improve the streaming quality, the P2P nature makes it difficult for these systems to attract users preferring to watch live streams in a browser or on mobile devices.

Emerging commercial live content broadcasting platforms are facing great challenges to accommodate large scale dynamic viewer populations. On the one hand, more traditional TV programs, such as nightly news and sports games, are now streamed online in higher quality. Popular programs can easily attract millions of viewers. On the other hand, the emerging User-Generated Live Content (UGLC) are gaining tremendous popularity through various streaming platforms (such as Twitch, Facebook Live, and YouTube Live, etc.) and at the same time bringing new challenges. Any random UGLC may suddenly become viral on social media as the result of social cascading and recommender promotion, and cause a flash crowd of viewers to watch the same content within a few minutes. Without geographic and network distributions of the viewers, it is difficult to provision streaming resources to accommodate such unpredictable flash crowds in advance. Existing solutions constantly suffer from balancing the cost of deploying at the edge close to the viewers, the quality of content delivery, and the ability to rapidly scale in the face of near instantaneous, large viewer demand.

Various solutions to improve CDN performance for live broadcasting have been proposed. For instance, VDN developed a centralized streaming optimization and a hybrid control plane to reduce the startup latency and improve routing choices across different CDN clusters. Footprint shows the benefits of delivering streaming services by jointly optimizing the data center to provide the service, wide area network (WAN) transport connectivity and the proxy selection. C3 proposes to improve video quality by helping clients to select better CDN sites through data-driven analysis.

Moreover, many live streaming platforms encourage interactions between content generators and viewers. For instance, Twitch offers viewers a chat box to send feedbacks to the broadcasters, while Facebook Live enables viewers to click emoji buttons while watching a broadcast. Such interactive features require UGLC streaming to have the minimized latency. Traditional CDN-based live broadcasting systems are incapable of meeting all the new demands CDN providers aggregate to one or multiple data centers to take advantage of the elasticity of Virtual Machine (VM) resources and the flexibility of routing inside data centers. However, the lack of edge presence makes the streaming vulnerable to long playback lag and congestion fluctuations in Wide Area Networks (WAN). Leading live streaming platforms like YouTube and Twitch can suffer from occasional service interruption and unstable video quality.

BRIEF DESCRIPTION OF THE DRAWINGS

Reference will now be made to the accompanying drawings, which are not necessarily drawn to scale, and wherein.

DETAILED DESCRIPTION

Figure 1:
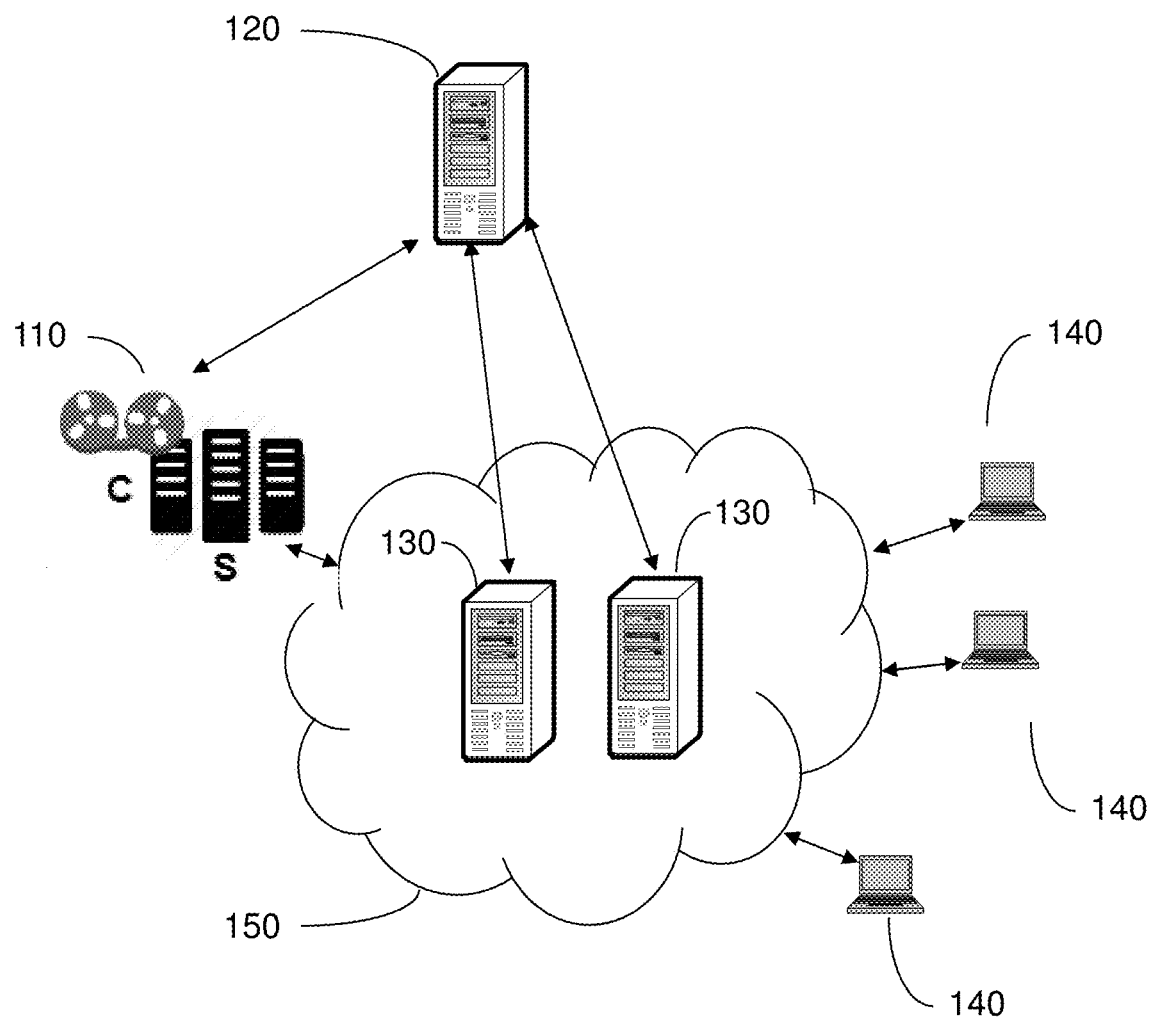
FIG. 1 is a schematic block diagram depicting an illustrative embodiment of a system for transport layer network service for content broadcasting.

The subject disclosure describes, among other things, illustrative embodiments for a system for synchronizing and dynamically chaining video broadcasts over transport layer connections. For example, the disclosure describes a processing system of a communication node routing data packets for a first streaming session between a viewer node of a plurality of viewer nodes and a content streaming server through the communication node without interrupting delivery of content data to the viewer node, establishing a second streaming session with the content streaming server to receive the content data, creating a first and second replacement connections by imitating a connections with the content streaming server and the viewer node, receiving a control packet over the second streaming session from the content streaming server, and splitting the first streaming session responsive to receiving the control packet. Other embodiments are described in the subject disclosure.

One or more aspects of the subject disclosure include a communication node that includes a processing system including a processor, and a memory that stores executable instructions that, when executed by the processing system, facilitate performance of operations, the operations comprising: intercepting a first streaming session directed to a viewer node of a plurality of viewer nodes without interrupting the first streaming session, wherein the first streaming session comprises content data, and wherein the first streaming session is supplied by a content streaming server; initiating a second streaming session with the content streaming server to receive the content data; creating a first replacement connection with the viewer node by imitating a connection of the content streaming server, creating a second replacement connection with the content streaming server by imitating a connection of the viewer node; splitting the first streaming session between the content streaming server and the viewer node of the plurality of viewer nodes responsive to obtaining a control packet over the second streaming session; and responsive to the splitting, streaming the content data received in the second streaming session to the viewer node without interrupting a delivery of the content data to the viewer node.

One or more aspects of the subject disclosure include a machine-readable storage medium, comprising executable instructions that, when executed by a processing system of a first communications node including a processor, facilitate performance of operations that include establishing a first streaming session with a second communication node in a network to receive content data streamed from a content streaming server, creating a connection with a viewer node of a plurality of viewer nodes by imitating a connection of the content streaming server with the viewer node, creating a connection with the content streaming server by imitating a connection of the viewer node with the content streaming server, splitting a second streaming session between the content streaming server and the viewer node, and responsive to the splitting, streaming the content data received from the second communication node over the first streaming session to the viewer node over the connection created with the viewer node.

One or more aspects of the subject disclosure include a method, comprising routing, by a processing system of a communication node comprising a processor, data packets for a first streaming session between a viewer node of a plurality of viewer nodes and a content streaming server through the communication node without interrupting delivery of content data to the viewer node; establishing, by the processing system, a second streaming session with the content streaming server to receive the content data; creating, by the processing system, a first replacement connection with the viewer node by imitating a connection of the content streaming server with the viewer node, creating, by the processing system, a second replacement connection with the content streaming server by imitating a connection of the viewer node; receiving, by the processing system, a control packet over the second streaming session from the content streaming server; and splitting, by the processing system, the first streaming session responsive to receiving the control packet.

Recently, major ISPs and cloud vendors have been investing heavily on developing integrated edge clouds. These edge clouds are deployed close to users and can provision virtual edge resources elastically from a centralized platform. Cloud vendors and CDNs have proposed various methods to enhance the coordination between their data centers and edge resources.

Today, most live broadcasting systems rely on CDN-based architectures to deliver live streams globally. By relaying the live content over one or multiple reflector sites, an overlay multicast tree is created to pass data from the origin content server to the edge servers in the regional data centers, which serve viewers directly through either Hyper-Text Transport (HTTP) or Real-Time Messaging (RTMP) protocols. Since the capacity and the egress bandwidth of each regional server can be very limited, most commercial streaming systems rely on the elasticity of the data center to handle varying traffic. Some systems can provision just enough server resources to handle daily traffic and rely on the assistance of other CDN providers in the case of overflow, while others have to prepare for the worst case to maintain consistent experience for all viewers.

Disclosed is a transparent network service to allow CDN servers to seamlessly leverage ISP edge cloud resources for broadcasting live content. The system introduces application layer changes for streaming service providers and is completely transparent to end users. The system can increase CDN server capacity by many multiples, and can effectively accommodate highly dynamic workloads with an improved service quality. Compared with other live broadcasting solutions, the system offers several distinct features.

On-the-fly Session Migration. The system employs layer-4 session hijacking techniques, which transparently migrate streaming sessions to communication nodes on-the-fly. Upon arrival, a new user can be immediately served by a CDN server and later seamlessly migrated to retrieve content from communication nodes. On-the-fly session migration enables all user sessions to be flexibly moved around to achieve better load balancing and work load consolidation, which significantly improves the system's response to flash crowds.

Dynamic Service Chaining. Recursive layer-4 session hijacking also enables service chaining of communication nodes: a node can act as an end user and retrieve content from another node. Dynamic multi-hop service chaining enables the system to scale fast while maintaining efficient delivery paths among nodes when facing a flash crowd.

Transparency and Compatibility. The system includes an ISO layer-4 (Transport Control Protocol (TCP)) service and can support any ISO layer-7 streaming applications. The system can be applied with no modification to the viewer, i.e., client side. The system is also compatible with any CDN optimization technique.

FIG. 1 is a schematic block diagram depicting an illustrative embodiment of a system for transport layer network service for content broadcasting. In this embodiment, the system 100 comprises a streaming server 110, a controller 120, communication nodes 130, and multiple viewer nodes 140 that are requesting the same content from server 110 over a network 150. In system 100, the streaming server 110 can serve each viewer node 140 directly via an individual transport session. A transport session is defined as the transport layer connection through which all session dependent signaling messages and content data are delivered. For most popular live streaming protocols (i.e., RTMP, HTTP Live Streaming (HLS)), the transport session refers to an established TCP connection. In an embodiment, the system can be easily modified to serve User Datagram Protocol (UDP) based streaming protocols, such as Real-time Transport Protocol (RTP)/RTP Control Protocol (RTCP). Upon each viewer access, server 110 sends the controller 120 a request that contains detailed transport information of the established session (address and port of both server and viewer), along with the ID of the content requested by the viewer. The streaming server 110 sets up a footprint session with the assigned communication node 130, if such a footprint session does not already exist. A footprint session is defined as a special transport session between streaming server 110 and a communication node 130. Once a footprint session is established, the streaming server 110 only sends one copy of content data to the footprint session, and only sends session-dependent signaling messages to corresponding transport sessions. The communication node 130 can detect and intervene (i.e., hijack) any transport session between streaming server 110 and viewer nodes 140.

After the footprint session is established, the communication node 130 is responsible for replicating and injecting content data from the footprint session to the hijacked transport sessions. From the viewer node 140 perspective, there is no knowledge of the existence of any intervention. The viewer node 140 receives all the signaling and data packets from the transport session set up with the streaming server 110 as if they were sent from the streaming server 110.

The responsibility of the controller 120 includes tracking evolving viewer demands, service quality, and resource availability, and given the information in the server request, the controller 120 determines which communication node 130 to be assigned to assist each transport session. Last, when a communication node 130 is ready for streaming, the controller 120 configures the network to chain the transport session through the assigned communication node.

Note that:

1) A footprint session is also a TCP connection. The streaming server 110 can treat the footprint session the same way as a transport session and request the controller 120 to assign a new communication node 130. Therefore, each communication node 130 behaves as if the communication node 130 is interacting directly with the streaming server 110, while the data may actually be injected by an upstream communication node 130. Such a design enables the system 100 to construct an efficient footprint session tree by dynamically chaining communication node 130 together and significantly reduce the overall network bandwidth usage.

2) A communication node 130 can be assigned to any transport session at any time. Therefore, after making the request to the controller, the streaming server 110 shall start streaming content data to the viewer node 140 directly through the established transport session immediately, and migrate the session on-the-fly to a communication node 130 later as instructed by the controller 120.

3) The streaming server 110 can detect a communication node 130 failure or sessions experiencing poor performance through the signaling messages received from the transport sessions. In an embodiment, failure handling can also be done by the controller to simplify streaming server in a large-scale deployment. When a failure event is detected, the streaming server 110 terminates the affected transport sessions. Typically, in client implementation, the disconnected viewers would re-initiate new sessions with the server. The streaming server 110 has the option to serve them directly or through other available communication nodes 130. Communication nodes 130 affected by an upstream communication node 130 failure are treated alike.

The scope of the system facilitates the collaboration between CDN and ISP. Such CDN-ISP collaboration only exists nowadays for large content and CDN providers who are capable of deploying customized server hardware to the ISP edge. In academia, NetPaaS proposes to share ISP information with CDN to optimize user-to-server assignments and server allocation. Different from these infrastructure sharing and information sharing approaches, the system demonstrates a new way of collaboration: providing a network service to allow CDN servers to seamlessly leverage ISP edge resources to handle extreme viewer dynamics.

TCP session hijacking was originally developed as a penetration technique to take over a connection between the server and the client to eavesdrop or intervene the connection on behalf of the server or the client. Recently, with the advance of Network Function Virtualization (NFV), transparent TCP proxies witness growing popularity. Through session hijacking, transparent proxies can perform various functionalities without disrupting an existing TCP connection or any application running on it. Various transparent HTTP proxies such as Squid can leverage transparent TCP proxying to deliver cached content to clients on behalf of the server behind an established HTTP session. The system utilizes TCP session hijacking to seamlessly migrate users to a communication node 130.

In an embodiment, the controller 120 communicates with communication node 130 and streaming servers 110 through remote procedure calls (RPC). In an embodiment, session hijacking and content injection logic are implemented using Netfilter and IPtables, which delegate packet processing to a user-space program in the communication node 130. In an embodiment, the RTMP enabled Nginx web server system is used for the streaming server 110. The RTMP protocol is currently a popular choice among live content providers such as Twitch and Facebook Live. A lightweight streaming plugin to the Nginx source code is attached to the server to subscribe to system services on the server side. Viewer nodes 140 may deploy off-the-shelf video players that support RTMP streaming.

The system 100 can leverage different techniques to steer any transport session through an assigned communication node 130. When a transport session traverses the network to reach a backbone of network 150, the communication node 130 has the chance to serve the session as an intermediary for the streaming server 110 (i.e., as a middlebox). Alternatively, if no communication node 130 is available on the path, the ISP can configure IP tunnels, adjust routing tables, or interact with SDNs controller to set up paths between any anchor points along the default routes and the communication node 130. By dynamically mapping sessions to particular tunnels or paths, and directing IP traffic accordingly, live sessions can be routed through the assigned communication node 130. In an embodiment, OpenFlow is used to setup paths between the streaming server 110 and the communication node 130, to steer the sessions.

Figure 2:
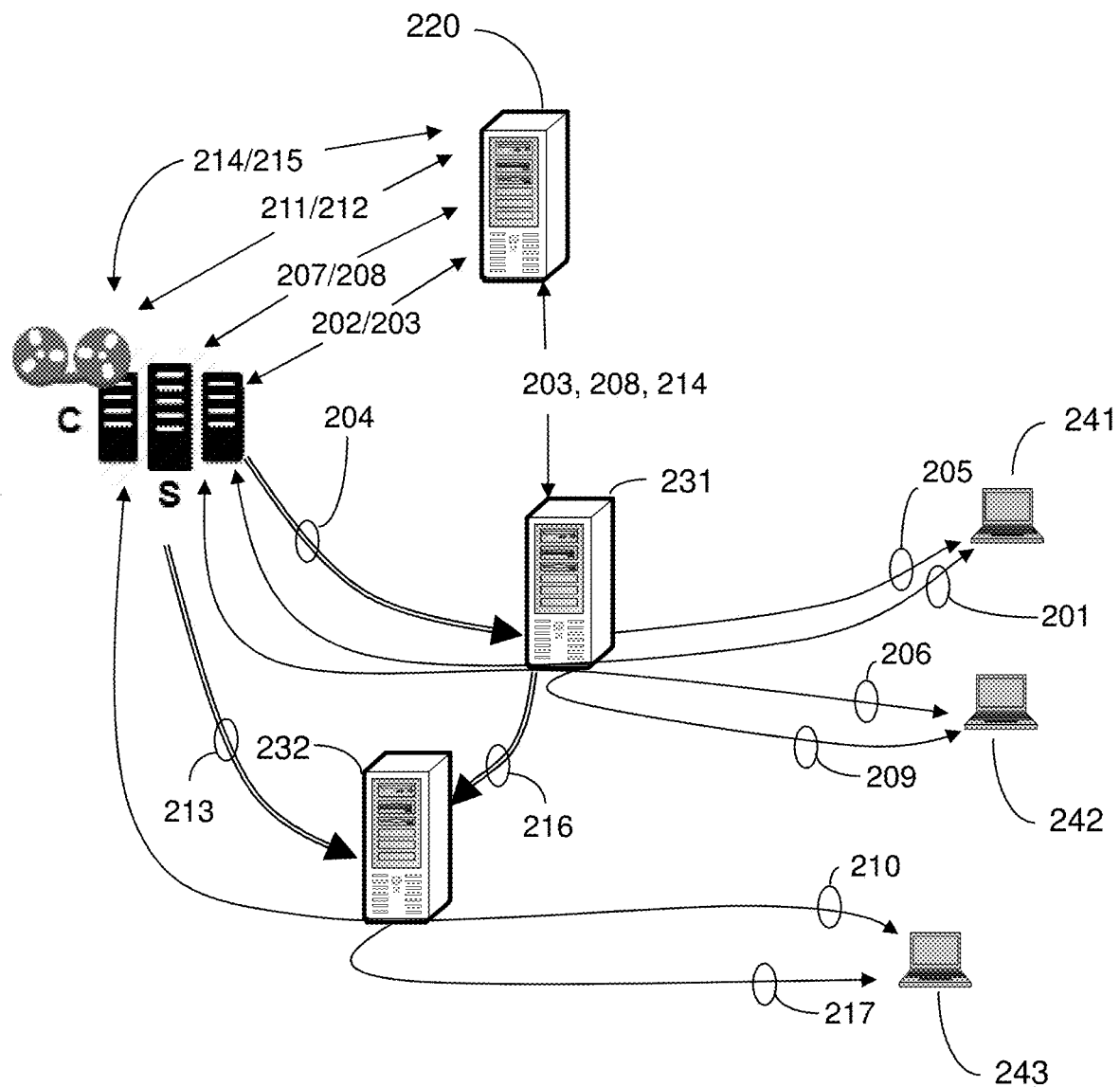
FIG. 2 depicts an illustrative embodiment of a connection flow method diagram for a system for transport layer network service for content broadcasting.

FIG. 2 depicts an illustrative embodiment of a connection flow diagram for the system. As shown in FIG. 2, a first viewer at viewer node 241 initiates a query via a transport session connection for a content C available at the streaming server S.

In step 201, a transport session connection between streaming server S and viewer node 241 is established using an application layer protocol. In step 202, in an embodiment, the streaming server S sends a register_viewer RPC request to a controller 220. Other message passing mechanisms known in the art can be used as a substitute for RPC calls identified herein. The request carries the transport information of the connection with the viewer and the content ID for content C.

In step 203, the controller decides to assign communication node 231 for this session. The controller prepares communication node 231 for streaming by: a) routing the transport session traffic of the transport session connection through communication node 231; b) providing the transport information of the transport session connection to communication node 231 for hijacking; and c) informing the communication node 231 when to expect content C from streaming server S. In one embodiment, a prepare RPC call from the controller 220 to communication node 231 informs the communication node that it should be prepared to hijack the transport session. The prepare RPC call carries three arguments: the content ID, the targeting transport session, and the helper footprint session. Once communication node 231 is ready, the controller 220 notifies S that communication node 231 is assigned to the session.

Upon receiving such notification, the streaming server S sets up the footprint session 204 and starts sending content through communication node 231.

In step 205, streaming server S switches to sending only signaling packets through the session when the footprint session with the communication node 231 is ready and then communication node 231 injects the received data to the session. This switching is explained in more detail in connection with FIG. 4 below. Note that streaming server S does not block to wait for communication node 231 to get ready. In one embodiment, after making the register_viewer RPC request, streaming server S may start streaming with viewer node 241 using the session.

In step 206, a second viewer at viewer node 242 queries the same content C, and a transport session is established. In step 207, the register_viewer request is sent to the controller. In step 208, the controller selects communication node 231 and communication node 231 is prepared to assist viewer node 242 as well. In this case, since the footprint session 204 is already active, in step 209, communication node 231 can replicate the received content data and inject to both viewer node 241 and viewer node 242.

In step 210, a third viewer at viewer node 243 queries content C from streaming server S. In step 211, streaming server S registers the viewer node 243 with controller 220. In step 212, the controller assigns the viewer node 243 to communication node 232, which is different from communication node 231.

When setting up the footprint session 213, instead of setting up a footprint session directly with communication node 232, streaming server S treats communication node 232 the same way as a viewer node, and sends a register_viewer request 214 to the controller 220 to register the communication node 232 as a new viewer. In step 215, the controller assigns communication node 231 to help prepare communication node 232. In this case, data from the footprint session 204 is directly injected to the new footprint session in step 216.

Subsequently, in step 217, communication node 232 injects the data again into the session with viewer node 243.

Figure 3:
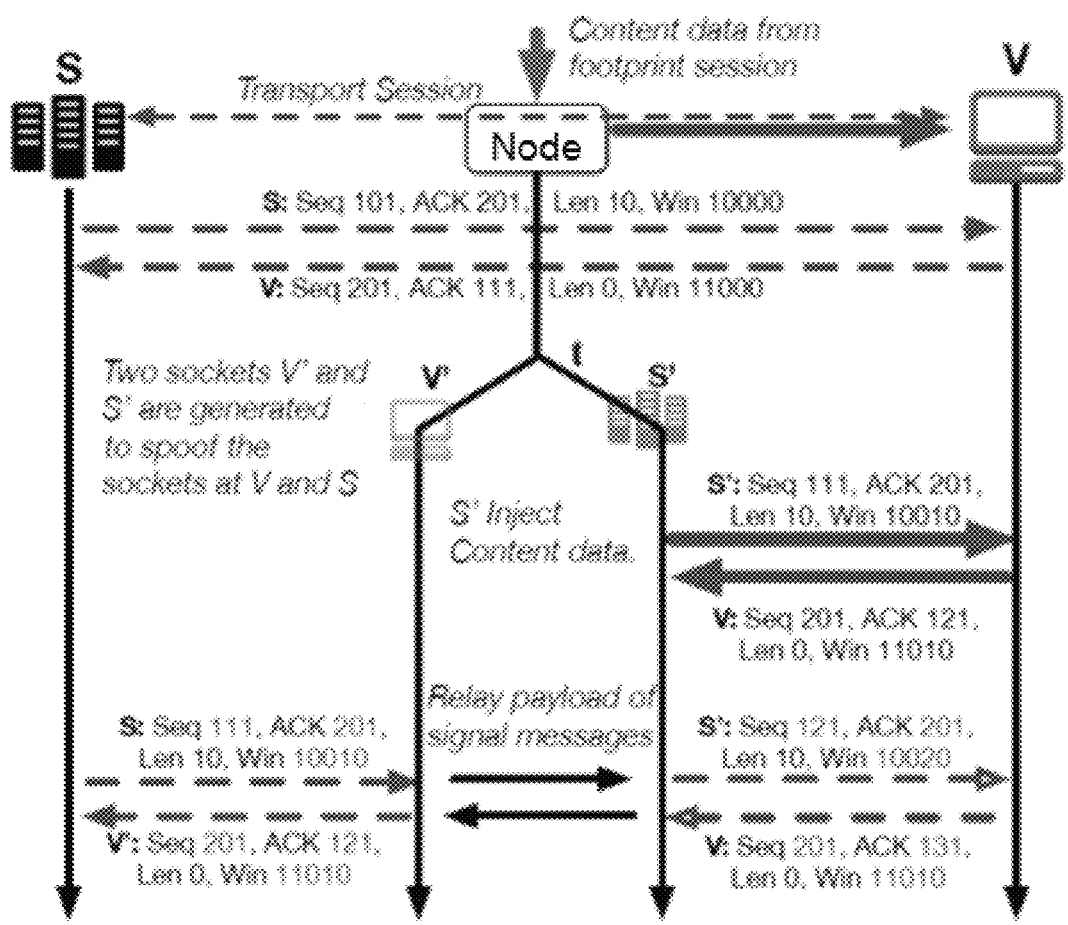
FIG. 3 depicts an illustrative embodiment of a flow diagram method used by a system for transport layer network service for content broadcasting to hijack a session.

FIG. 3 depicts an illustrative embodiment of a flow diagram method used by a system for transport layer network service for content broadcasting to hijack a session and inject content packets received from the footprint session into the transport sessions, which are all TCP connections. FIG. 3 illustrates one example of hijacking a transport session between S and V. In an embodiment Netfilter hooks are implemented in a kernel module that can access any packet chained through the communication node. A user-space program listens to RPC calls from the controller. Upon receiving a prepare call, the program informs the kernel module to transparently sniff the packets of the transport session that should be hijacked, where the TCP session states, such as SEQ/ACK numbers and timestamps, can be tracked. At time t, the Node creates (i.e., spoofs) two TCP sockets matching those currently existing for S and V, and then breaks the original transport session into two subsessions. The kernel module spoofs SYN-ACKs from V to S' and S to V' to fake the handshake for S' and V', respectively. In particular, the TCP socket S' at the Node facing the viewer spoofs the socket S, while V' facing the server spoofs socket V. Through the spoofed S', the Node can inject content data received from the footprint session on behalf of the streaming server. The payloads of the signaling packets between S and V are relayed between V' and S'. After hijacking, the Node applies constant offsets to SEQ/ACK numbers for the TCP sessions, modifies source/destination addresses and set local timestamps to proxy packets from the original transport session to the two subsessions and vice-versa. Consequently, the Node only maintains in the order of tens of constants for each session with no time-varying states. The two subsessions work independently to handle transport functions such as congestion control and retransmission.

Figure 4:
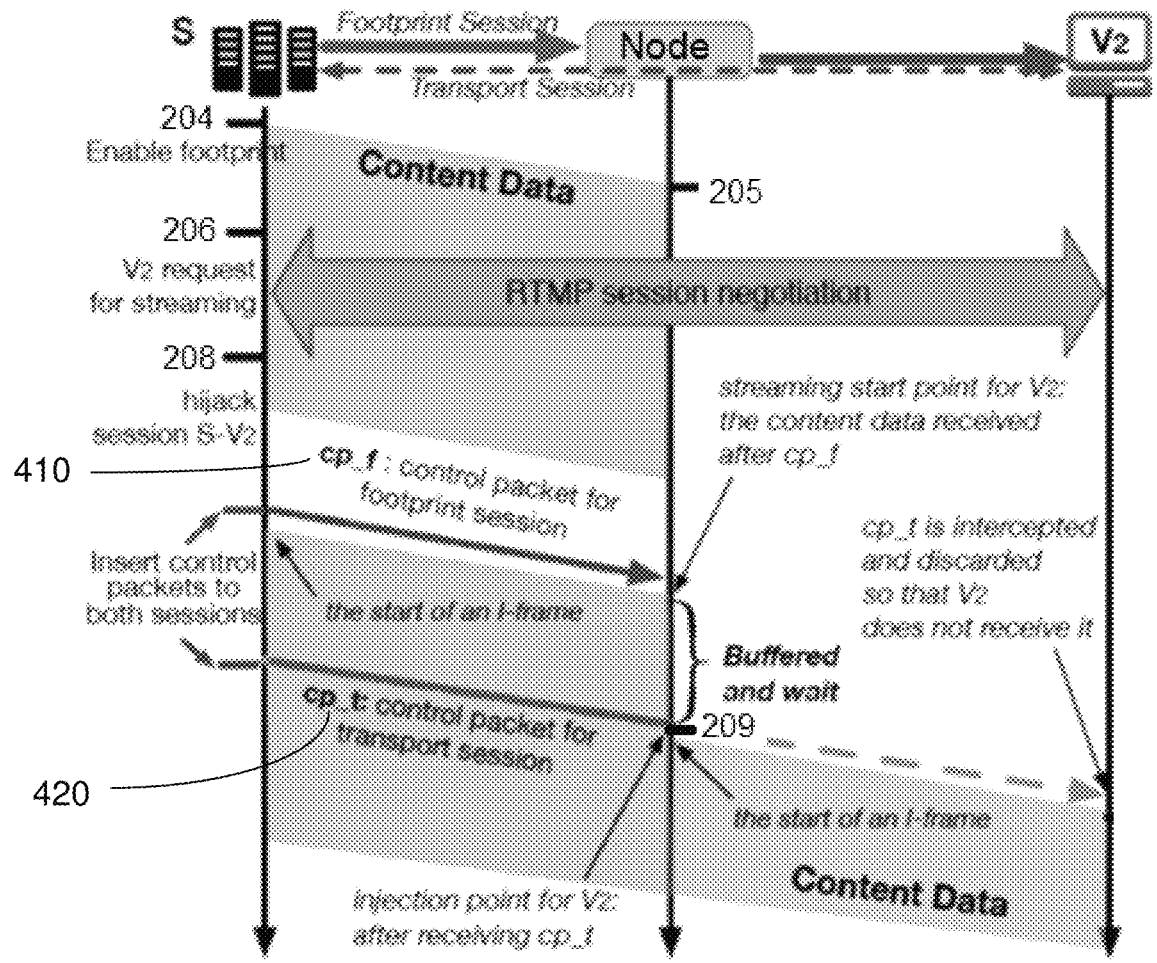
FIG. 4 depicts an illustrative embodiment of a flow diagram method used by a system for transport layer network service for content broadcasting to achieve video synchronization during the hijacking process.

FIG. 4 depicts an illustrative embodiment of a flow diagram method used by a system for transport layer network service for content broadcasting to achieve video synchronization during the hijacking process. In the previous workflow example illustrated in FIG. 2, viewer node 242 joins the streaming and expects to receive video injected by communication node 231 at step 209. However, since communication node 231 has already started streaming with S and viewer node 241 at the time, a mechanism is required to inform communication node 231 of all the live video that communication node 231 is receiving from S, and which exact packet that the communication node 231 should start injecting into the session with viewer node 242. Failing to pinpoint a precise starting point may compromise the reliable transport of packets and cause viewer node 242 to receive incorrect data and break the application logic.

To address this problem, two control packets 410 and 420 are sent in both the transport session and the footprint session for video synchronization. FIG. 4 provides a step-by-step illustration of how this control method works. As shown in FIG. 4, streaming server S sets up the footprint session 204 with communication node 231 and starts sending content through communication node 231, and communication node 231 injects the received data to session with viewer node 241 at step 205.

In step 206, when a second viewer at viewer node 242 queries the same content C, the transport session with viewer node 242 is established. In step 208, the controller selects communication node 231. Communication node 231 is prepared to hijack the session between the streaming server S and viewer node 242. Control packet 410 added to the footprint session between the server S and communication node 231, which marks the first packet needed by viewer node 242. In an embodiment, when the media is, for example, video, the streaming server S marks the first video packet needed by viewer node 242, at an i-frame, for example. The control packet 420 is added to the transport session with viewer node 242 to indicate when communication node 231 can start injecting content data packets. In step 209, communication node 231 can replicate the received content data and inject to the session with viewer node 242 as guided by the control packets. Both control packets 410, 420 will be intercepted and dropped by the communication node 231 so that viewer node 242 is not aware of them.

Although the control packets are currently designed for video synchronization, such mechanism can be extended to serve general session control functionalities. Compared to the RPC calls that require the controller to participate, in band control packets are more responsive and are in sync with the transport session. By sending control packets with different formats, the server may flexibly offload various application functionalities to the assigned to communication nodes.

Modern content services are generally encrypted from service provider to end users. In an embodiment, one basic assumption is that the content provider owns or share secure domains with the communication nodes. Therefore, encryption can be offloaded to communication nodes. In such an embodiment, transport layer security (TLS) can be implemented in the communication node for content encryption. To accommodate bandwidth variabilities for different viewers, control packets for communication nodes can be extended to adaptively select appropriate bitrates for individual users.

The centralized control logic may include code that carefully engineers the placement of communication nodes, which can effectively reduce network traffic and provide better streaming quality to viewers. Optimized deployment of communication nodes may depend on the geo-locations of the streaming servers, the clouds and the viewers, the network topology and utilization, available cloud resources. Furthermore, mapping user requests to deployed communication nodes affect the service quality. In an embodiment, joint optimization of communication node placement, session mapping, and fine-grain traffic engineering is also an achievable goal.

While for purposes of simplicity of explanation, the respective processes are shown and described as a series of steps or blocks in FIGS. 2-4, it is to be understood and appreciated that the claimed subject matter is not limited by the order of the steps or blocks, as some steps may occur in different orders and/or concurrently with other steps from what is depicted and described herein. Moreover, not all illustrated steps or blocks may be required to implement the methods described herein.

Figure 5:
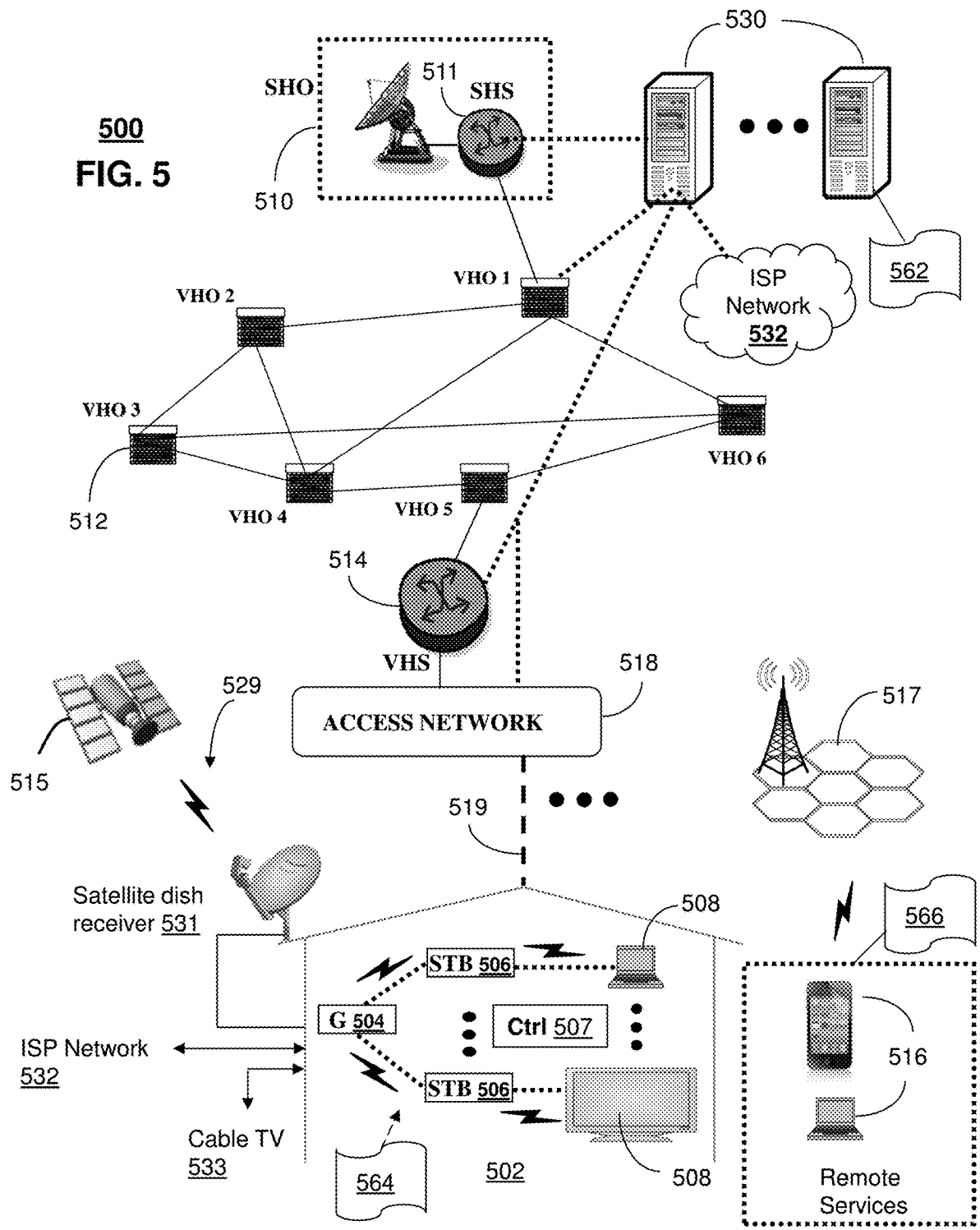
FIGS. 5-6 depict illustrative embodiments of communication systems that provide media services in a system for transport layer network service for content broadcasting.

FIG. 5 depicts an illustrative embodiment of a communication system 500 for providing various communication services, such as delivering media content. The communication system 500 can represent an interactive media network, such as an interactive television system (e.g., an Internet Protocol Television (IPTV) media system). Communication system 500 can be overlaid or operably coupled with system 100 of FIG. 1 as another representative embodiment of communication system 500. For instance, one or more devices illustrated in the communication system 500 of FIG. 5 may include a communication node comprising a processor that performs operations including intercepting a first streaming session directed to a viewer node of a plurality of viewer nodes without interrupting the first streaming session, wherein the first streaming session comprises content data, and wherein the first streaming session is supplied by a content streaming server, initiating a second streaming session with the content streaming server to receive the content data, creating a first replacement connection with the viewer node by imitating a connection of the content streaming server, creating a second replacement connection with the content streaming server by imitating a connection of the viewer node, splitting the first streaming session between the content streaming server and the viewer node of the plurality of viewer nodes responsive to obtaining a control packet over the second streaming session, and streaming the content data to the viewer node.

In one or more embodiments, the communication system 500 can include a super head-end office (SHO) 510 with at least one super headend office server (SHS) 511 which receives media content from satellite and/or terrestrial communication systems. In the present context, media content can represent, for example, audio content, moving image content such as 2D or 3D videos, video games, virtual reality content, still image content, and combinations thereof. The SHS server 511 can forward packets associated with the media content to one or more video head-end servers (VHS) 514 via a network of video head-end offices (VHO) 512 according to a multicast communication protocol. The VHS 514 can distribute multimedia broadcast content via an access network 518 to commercial and/or residential buildings 502 housing a gateway 504 (such as a residential or commercial gateway).

The access network 518 can represent a group of digital subscriber line access multiplexers (DSLAMs) located in a central office or a service area interface that provide broadband services over fiber optical links or copper twisted pairs 519 to buildings 502. The gateway 504 can use communication technology to distribute broadcast signals to media processors 506 such as Set-Top Boxes (STBs) which in turn present broadcast channels to media devices 508 such as computers or television sets managed in some instances by a media controller 507 (such as an infrared or RF remote controller).

The gateway 504, the media processors 506, and media devices 508 can utilize tethered communication technologies (such as coaxial, powerline or phone line wiring) or can operate over a wireless access protocol such as Wireless Fidelity (WiFi), Bluetooth®, ZigBee®, or other present or next generation local or personal area wireless network technologies. By way of these interfaces, unicast communications can also be invoked between the media processors 506 and subsystems of the IPTV media system for services such as video-on-demand (VoD), browsing an electronic programming guide (EPG), or other infrastructure services.

A satellite broadcast television system 529 can be used in the media system of FIG. 5. The satellite broadcast television sion system can be overlaid, operably coupled with, or replace the IPTV system as another representative embodiment of communication system 500. In this embodiment, signals transmitted by a satellite 515 that include media content can be received by a satellite dish receiver 531 coupled to the building 502. Modulated signals received by the satellite dish receiver 531 can be transferred to the media processors 506 for demodulating, decoding, encoding, and/or distributing broadcast channels to the media devices 508. The media processors 506 can be equipped with a broadband port to an Internet Service Provider (ISP) network 532 to enable interactive services such as VoD and EPG as described above.

In yet another embodiment, an analog or digital cable broadcast distribution system such as cable TV system 533 can be overlaid, operably coupled with, or replace the IPTV system and/or the satellite TV system as another representative embodiment of communication system 500. In this embodiment, the cable TV system 533 can also provide Internet, telephony, and interactive media services. Communication system 500 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 530, a portion of which can operate as a web server for providing web portal services over the ISP network 532 to wireline media devices 508 or wireless communication devices 516.

Communication system 500 can also provide for all or a portion of the computing devices 530 to function as a communication node (herein referred to as communication node 530). The communication node 530 can use computing and communication technology to perform function 562, which can include among other things, the session hijacking and dynamic chaining techniques described by methods 200-400 of FIGS. 2-4. For instance, function 562 of communication node 530 can be similar to the functions described for communication nodes 130 of FIG. 1 in accordance with methods 200-400. The media processors 506 and wireless communication devices 516 can be provisioned with software functions 564 and 566, respectively, to utilize the services of communication node 530. For instance, functions 564 and 566 of media processors 506 and wireless communication devices 516 can be similar to the functions described for the viewer nodes 140 of FIG. 1 in accordance with methods 200-400 of FIGS. 2-4.

Multiple forms of media services can be offered to media devices over landline technologies such as those described above. Additionally, media services can be offered to media devices by way of a wireless access base station 517 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 6:
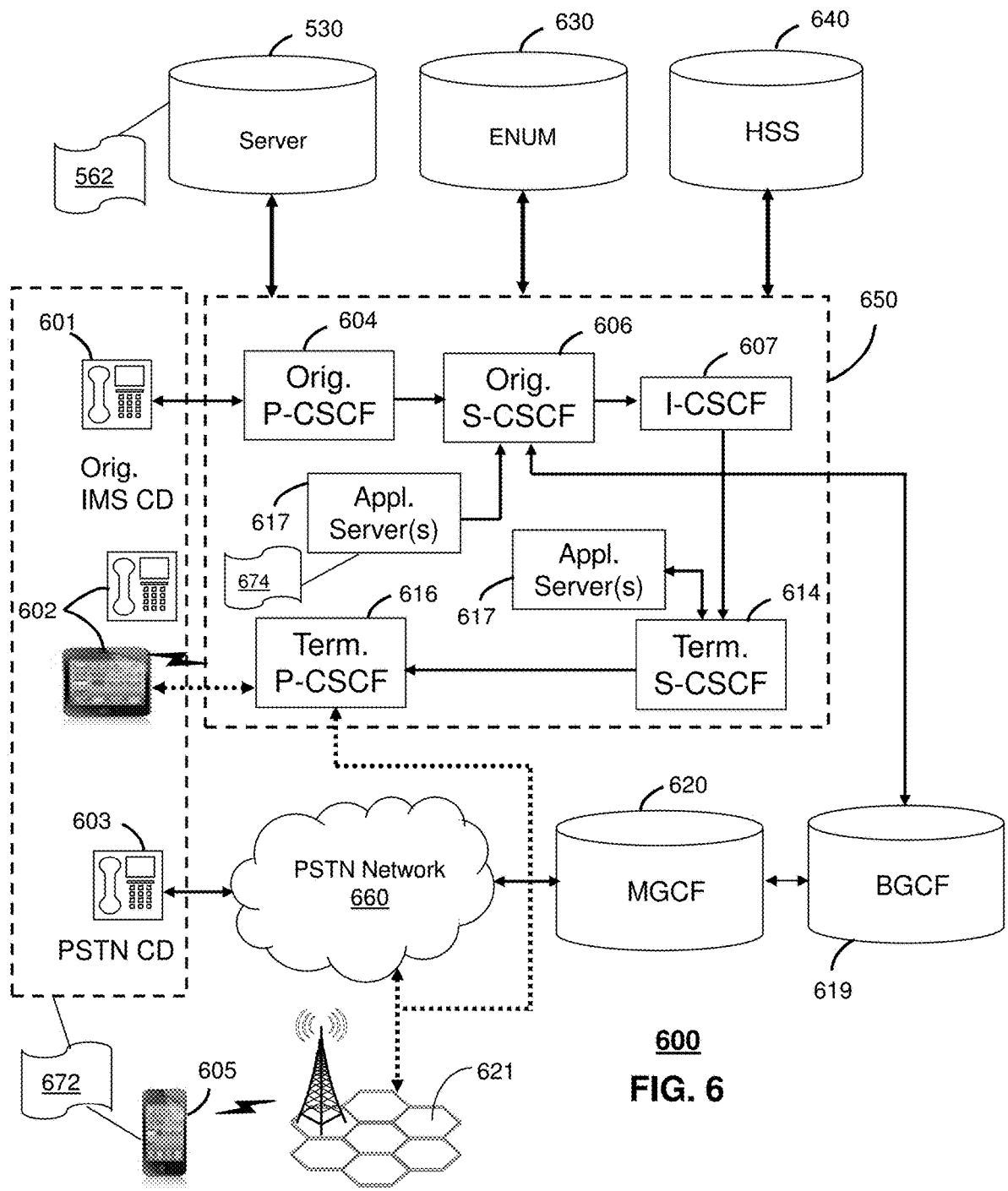

FIG. 6 depicts an illustrative embodiment of a communication system 600 employing an IP Multimedia Subsystem (IMS) network architecture to facilitate the combined services of circuit-switched and packet-switched systems. Communication system 600 can be overlaid or operably coupled with system 100 of FIG. 1 and communication system 500 as another representative embodiment of communication system 500. For instance, one or more devices illustrated in the communication system 600 of FIG. 6 may include a communication node comprising a processor that performs operations including intercepting a first streaming session directed to a viewer node of a plurality of viewer nodes without interrupting the first streaming session, wherein the first streaming session comprises content data, and wherein the first streaming session is supplied by a content streaming server, initiating a second streaming session with the content streaming server to receive the content data, creating a first replacement connection with the viewer node by imitating a connection of the content streaming server, creating a second replacement connection with the content streaming server by imitating a connection of the viewer node, splitting the first streaming session between the content streaming server and the viewer node of the plurality of viewer nodes responsive to obtaining a control packet over the second streaming session, and streaming the content data to the viewer node.

Communication system 600 can comprise a Home Subscriber Server (HSS) 640, a tElephone NUmber Mapping (ENUM) server 630, and other network elements of an IMS network 650. The IMS network 650 can establish communications between IMS-compliant communication devices (CDs) 601, 602, Public Switched Telephone Network (PSTN) CDs 603, 605, and combinations thereof by way of a Media Gateway Control Function (MGCF) 620 coupled to a PSTN network 660. The MGCF 620 need not be used when a communication session involves IMS CD to IMS CD communications. A communication session involving at least one PSTN CD may utilize the MGCF 620.

IMS CDs 601, 602 can register with the IMS network 650 by contacting a Proxy Call Session Control Function (P-CSCF) which communicates with an interrogating CSCF (I-CSCF), which in turn, communicates with a Serving CSCF (S-CSCF) to register the CDs with the HSS 640. To initiate a communication session between CDs, an originating IMS CD 601 can submit a Session Initiation Protocol (SIP INVITE) message to an originating P-CSCF 604 which communicates with a corresponding originating S-CSCF 606. The originating S-CSCF 606 can submit the SIP INVITE message to one or more application servers (ASs) 617 that can provide a variety of services to IMS subscribers.

For example, the application servers 617 can be used to perform originating call feature treatment functions on the calling party number received by the originating S-CSCF 606 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 606 can submit queries to the ENUM system 630 to translate an E.164 telephone number in the SIP INVITE message to a SIP Uniform Resource Identifier (URI) if the terminating communication device is IMS-compliant. The SIP URI can be used by an Interrogating CSCF (I-CSCF) 607 to submit a query to the HSS 640 to identify a terminating S-CSCF 614 associated with a terminating IMS CD such as reference 602. Once identified, the I-CSCF 607 can submit the SIP INVITE message to the terminating S-CSCF 614. The terminating S-CSCF 614 can then identify a terminating P-CSCF 616 associated with the terminating CD 602. The P-CSCF 616 may then signal the CD 602 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 6 may be interchangeable. It is further noted that communication system 600 can be adapted to support video conferencing. In addition, communication system 600 can be adapted to provide the IMS CDs 601, 602 with the multimedia and Internet services of communication system 500 of FIG. 5.

If the terminating communication device is instead a PSTN CD such as CD 603 or CD 605 (in instances where the cellular phone only supports circuit-switched voice communications), the ENUM system 630 can respond with an unsuccessful address resolution which can cause the originating S-CSCF 606 to forward the call to the MGCF 620 via a Breakout Gateway Control Function (BGCF) 619. The MGCF 620 can then initiate the call to the terminating PSTN CD over the PSTN network 660 to enable the calling and called parties to engage in voice and/or data communications.

It is further appreciated that the CDs of FIG. 6 can operate as wireline or wireless devices. For example, the CDs of FIG. 6 can be communicatively coupled to a cellular base station 621, a femtocell, a WiFi router, a Digital Enhanced Cordless Telecommunications (DECT) base unit, or another suitable wireless access unit to establish communications with the IMS network 650 of FIG. 6. The cellular access base station 621 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 6.

Cellular phones supporting LTE can support packet-switched voice and packet-switched data communications and thus may operate as IMS-compliant mobile devices. In this embodiment, the cellular base station 621 may communicate directly with the IMS network 650 as shown by the arrow connecting the cellular base station 621 and the P-CSCF 616.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The communication node 530 of FIG. 5 can be operably coupled to communication system 600 for purposes similar to those described above. Communication node 530 can perform function 562 and thereby provide streaming services to the CDs 601, 602, 603 and 605 of FIG. 6 similar to the functions described for communication node 130 of FIG. 1 in accordance with methods 200-400 of FIGS. 2-4. CDs 601, 602, 603 and 605, which can be adapted with software to perform function 672 to utilize the services of the communication node 630 similar to the functions described for viewer nodes 140 of FIG. 1 in accordance with methods 200-400 of FIGS. 2-4. Communication node 630 can be an integral part of the application server(s) 617 performing function 674, which can be substantially similar to function 562 and adapted to the operations of the IMS network 650.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 7:
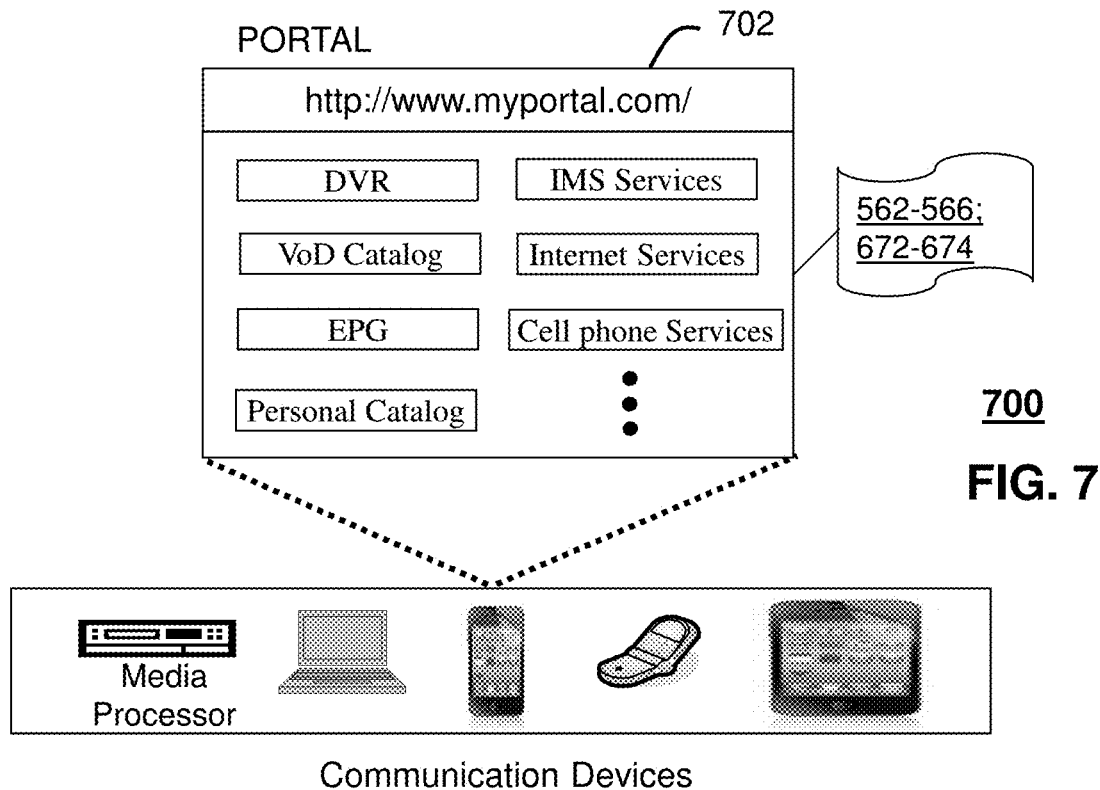
FIG. 7 depicts an illustrative embodiment of a web portal for interacting with the communication systems of a system for transport layer network service for content broadcasting.

FIG. 7 depicts an illustrative embodiment of a web portal 702 of a communication system 700. Communication system 700 can be overlaid or operably coupled with system 100 of FIG. 1, communication system 500, and/or communication system 600 as another representative embodiment of system 100 of FIG. 1, communication system 500, and/or communication system 600. The web portal 702 can be used for managing services of system 100 of FIG. 1 and communication systems 500-600. A web page of the web portal 702 can be accessed by a Uniform Resource Locator (URL) with an Internet browser using an Internet-capable communication device such as those described in FIG. 1 and FIGS. 5-6. The web portal 702 can be configured, for example, to access a media processor 506 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 506. The web portal 702 can also be used for provisioning IMS services described earlier, provisioning Internet services, provisioning cellular phone services, and so on.

The web portal 702 can further be utilized to manage and provision software applications 562-566, and 672-674 to adapt these applications as may be desired by subscribers and/or service providers of system 100 of FIG. 1, and communication systems 500-600. For instance, users of the services provided by server 110 or server 530 can log into their on-line accounts and provision the servers 110 or server 530 with features that a user may want to program, such as user profiles, provide contact information to server to enable it to communication with devices described in FIG. 1, and so on. Service providers can log onto an administrator account to provision, monitor and/or maintain the system 100 of FIG. 1 or server 530.

Figure 8:
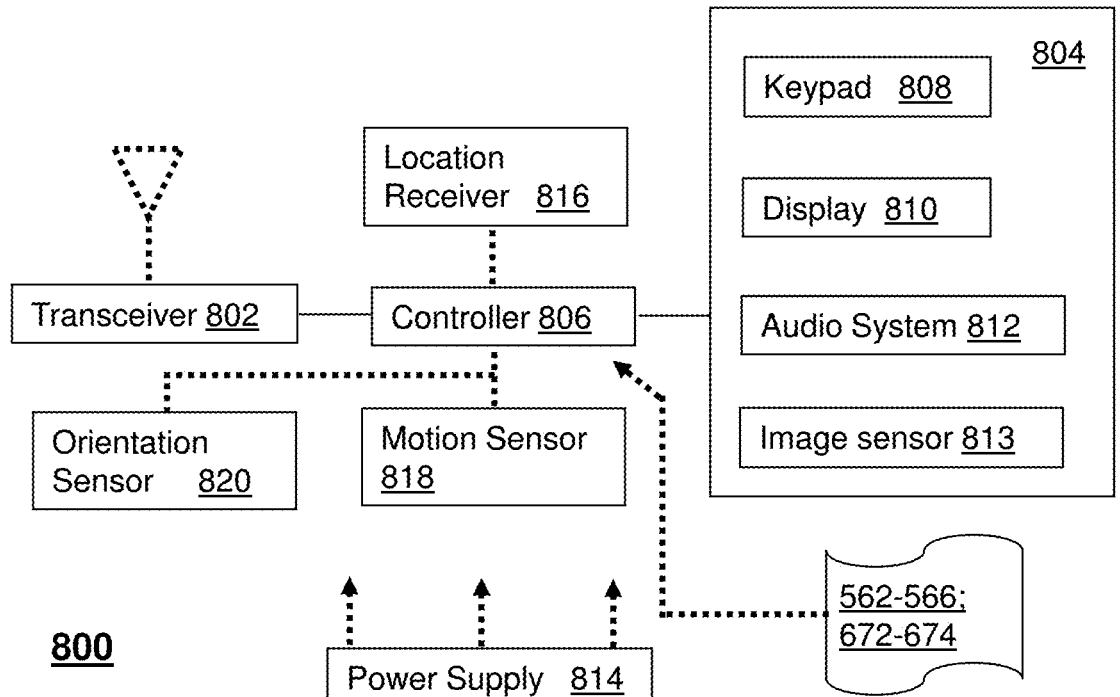
FIG. 8 depicts an illustrative embodiment of a communication device.

FIG. 8 depicts an illustrative embodiment of a communication device 800. Communication device 800 can serve in whole or in part as an illustrative embodiment of the devices depicted in FIGS. 1-6 and can be configured to perform portions of methods 200-400 of FIGS. 2-4.

Communication device 800 can comprise a wireline and/or wireless transceiver 802 (herein transceiver 802), a user interface (UI) 804, a power supply 814, a location receiver 816, a motion sensor 818, an orientation sensor 820, and a controller 806 for managing operations thereof. The transceiver 802 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 802 can also be adapted to support circuit-switched wireline access technologies (such as PSTN), packet-switched wireline access technologies (such as TCP/IP, VoIP, etc.), and combinations thereof.

The UI 804 can include a depressible or touch-sensitive keypad 808 with a navigation mechanism such as a roller ball, a joystick, a mouse, or a navigation disk for manipulating operations of the communication device 800. The keypad 808 can be an integral part of a housing assembly of the communication device 800 or an independent device operably coupled thereto by a tethered wireline interface (such as a USB cable) or a wireless interface supporting for example Bluetooth®. The keypad 808 can represent a numeric keypad commonly used by phones, and/or a QWERTY keypad with alphanumeric keys. The UI 804 can further include a display 810 such as monochrome or color LCD (Liquid Crystal Display), OLED (Organic Light Emitting Diode) or other suitable display technology for conveying images to an end user of the communication device 800. In an embodiment where the display 810 is touch-sensitive, a portion or all of the keypad 808 can be presented by way of the display 810 with navigation features.

The display 810 can use touch screen technology to also serve as a user interface for detecting user input. As a touch screen display, the communication device 800 can be adapted to present a user interface with graphical user interface (GUI) elements that can be selected by a user with a touch of a finger. The touch screen display 810 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 810 can be an integral part of the housing assembly of the communication device 800 or an independent device communicatively coupled thereto by a tethered wireline interface (such as a cable) or a wireless interface.

The UI 804 can also include an audio system 812 that utilizes audio technology for conveying low volume audio (such as audio heard in proximity of a human ear) and high volume audio (such as speakerphone for hands free operation). The audio system 812 can further include a microphone for receiving audible signals of an end user. The audio system 812 can also be used for voice recognition applications. The UI 804 can further include an image sensor 813 such as a charged coupled device (CCD) camera for capturing still or moving images.

The power supply 814 can utilize common power management technologies such as replaceable and rechargeable batteries, supply regulation technologies, and/or charging system technologies for supplying energy to the components of the communication device 800 to facilitate long-range or short-range portable applications. Alternatively, or in combination, the charging system can utilize external power sources such as DC power supplied over a physical interface such as a USB port or other suitable tethering technologies.

The location receiver 816 can utilize location technology such as a global positioning system (GPS) receiver capable of assisted GPS for identifying a location of the communication device 800 based on signals generated by a constellation of GPS satellites, which can be used for facilitating location services such as navigation. The motion sensor 818 can utilize motion sensing technology such as an accelerometer, a gyroscope, or other suitable motion sensing technology to detect motion of the communication device 800 in three-dimensional space. The orientation sensor 820 can utilize orientation sensing technology such as a magnetometer to detect the orientation of the communication device 800 (north, south, west, and east, as well as combined orientations in degrees, minutes, or other suitable orientation metrics).

The communication device 800 can use the transceiver 802 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 806 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 800.

Other components not shown in FIG. 8 can be used in one or more embodiments of the subject disclosure. For instance, the communication device 800 can include a reset button (not shown). The reset button can be used to reset the controller 806 of the communication device 800. In yet another embodiment, the communication device 800 can also include a factory default setting button positioned, for example, below a small hole in a housing assembly of the communication device 800 to force the communication device 800 to re-establish factory settings. In this embodiment, a user can use a protruding object such as a pen or paper clip tip to reach into the hole and depress the default setting button. The communication device 800 can also include a slot for adding or removing an identity module such as a Subscriber Identity Module (SIM) card. SIM cards can be used for identifying subscriber services, executing programs, storing subscriber data, and so forth.

The communication device 800 as described herein can operate with more or less of the circuit components shown in FIG. 8. These variant embodiments can be used in one or more embodiments of the subject disclosure.

The communication device 800 can be adapted to perform the functions of devices of FIGS. 1-4, the media processor 506, the media devices 508, or the portable communication devices 516 of FIG. 5, as well as the IMS CDs 601-602 and PSTN CDs 603-605 of FIG. 6. It will be appreciated that the communication device 800 can also represent other devices that can operate in system 100 of FIG. 1, communication systems 500-600 of FIGS. 5-6 such as a gaming console and a media player. In addition, the controller 806 can be adapted in various embodiments to perform the functions 562-566 and 672-674, respectively.

Upon reviewing the aforementioned embodiments, it would be evident to an artisan with ordinary skill in the art that said embodiments can be modified, reduced, or enhanced without departing from the scope of the claims described below. For example, the controller can assign a communication node to split an existing transport session between a server and a viewer node or another communication node without interrupting the transport session. If the assigned communication node fails, error recovery logic implemented in the controller at the application layer can re-establish the transport layer session, and any sessions layered above the transport layer session. Further, the error recovery logic can request a new communication node. In an embodiment, the controller can replace a failed communication node with a new communication node and migrate an already split transport session from the failed communication node to the new communication node without interrupting the transport layer session or any sessions layered above the transport layer session.

In another example, the control packets may be used for purposes beyond pinpointing an accurate position in the data stream for the communication node to stream data. For example, the control packets may be used to share information between the streaming server and the communication node. More specifically, in an embodiment, control packets may contain information such as a viewer node's public key in a public key encryption (PKI) scheme, so that the communication node may encrypt the data stream sent to the viewer node, where the viewer node may use its private key to decrypt the data stream, thereby securing the integrity of the data stream. In another example, control packets may contain stream selection information in an adaptive streaming rate scenario. In such a scenario, the communication node may send data streams of different quality to the viewer node based on the information conveyed in the control packet. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 9:
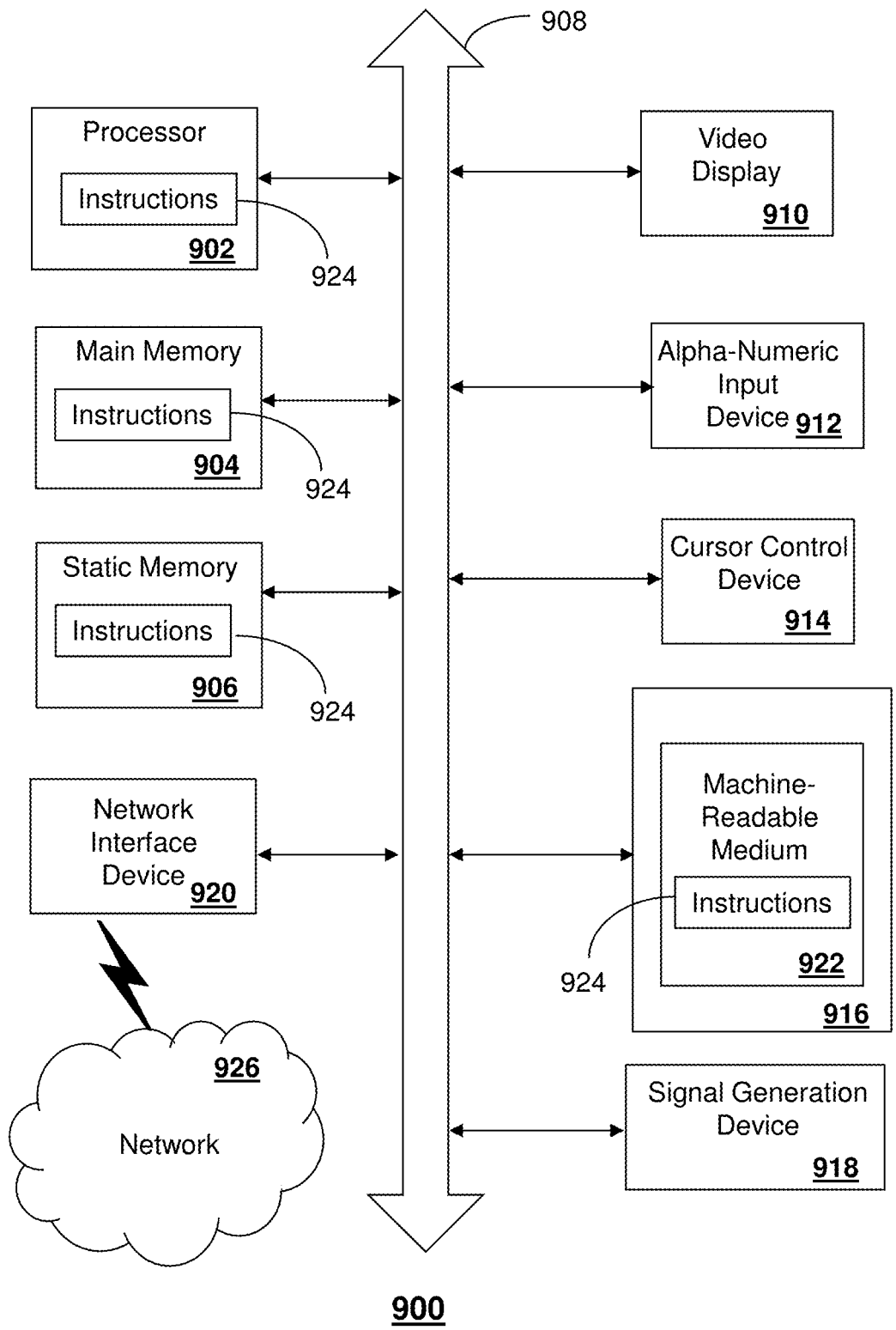
FIG. 9 is a diagrammatic representation of a machine in the form of a computer system within which a set of instructions, when executed, may cause the machine to perform any one or more of the methods described herein.

FIG. 9 depicts an exemplary diagrammatic representation of a machine in the form of a computer system 900 within which a set of instructions, when executed, may cause the machine to perform any one or more of the methods described above. One or more instances of the machine can operate, for example, as the communication node 530, the media processor 506, the streaming server 110, the controller 120, the viewer nodes 140 and other devices of FIGS. 1-4. In some embodiments, the machine may be connected (e.g., using a network 926) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 900 may include a processor (or controller) 902 (e.g., a central processing unit (CPU)), a graphics processing unit (GPU, or both), a main memory 904 and a static memory 906, which communicate with each other via a bus 908. The computer system 900 may further include a display unit 910 (e.g., a liquid crystal display (LCD), a flat panel, or a solid state display). The computer system 900 may include an input device 912 (e.g., a keyboard), a cursor control device 914 (e.g., a mouse), a disk drive unit 916, a signal generation device 918 (e.g., a speaker or remote control) and a network interface device 920. In distributed environments, the embodiments described in the subject disclosure can be adapted to utilize multiple display units 910 controlled by two or more computer systems 900. In this configuration, presentations described by the subject disclosure may in part be shown in a first of the display units 910, while the remaining portion is presented in a second of the display units 910.

The disk drive unit 916 may include a tangible computer-readable storage medium 922 on which is stored one or more sets of instructions (e.g., software 924) embodying any one or more of the methods or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 922 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, ZigBee®), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A communication node, comprising:
a processing system including a processor; and
a memory that stores executable instructions that, when executed by the processing system, facilitate performance of operations, comprising:
intercepting, by the processing system, a first streaming session between a content streaming server and a first viewer node of a plurality of viewer nodes, the first streaming session comprising content;
responsive to an instruction to stream the content to a second viewer node of the plurality of viewer nodes, intercepting, by the processing system, a second streaming session between the content streaming server and the second viewer node;
receiving, from the content streaming server, control data marking a first content item needed by the second viewer node for transport of content data of the content to the second viewer node;
replicating, by the processing system, the content data, resulting in replicated content data; and
injecting, by the processing system, the replicated content data into the first streaming session and the second streaming session to synchronously provide the replicated content data to both the first viewer node and the second viewer node of the plurality of viewer nodes.

2. The communication node of claim 1, wherein the injecting the replicated content data comprises beginning injection of the replicated content data into the first streaming session and the second streaming session according to the control data.

3. The communication node of claim 2, wherein the receiving control data comprises receiving a first control packet and receiving a second control packet, and wherein the beginning injection of the replicated content data comprises injecting the first control packet to mark a first packet needed by the first viewer node and injecting the second control packet to mark a time to begin injecting the replicated content data.

4. The communication node of claim 3, wherein the content data comprises video and wherein the first packet contains content data comprising an i-frame of the video.

5. The communication node of claim 1, wherein the first streaming session comprises a transport layer connection between the content streaming server and the first viewer node, and the second streaming session comprises a transport layer connection between the content streaming server and the second viewer node.

6. The communication node of claim 1, wherein the operations further comprise:
creating a spoofed transport control protocol (TCP) socket that faces the second viewer node, the spoofed TCP socket matching an existing socket at the content streaming server, and injecting the replicated content data into the second streaming session via the spoofed TCP socket.

7. The communication node of claim 1, wherein the operations further comprise:
creating a spoofed transport control protocol (TCP) socket that faces the content streaming server, the spoofed TCP socket matching an existing socket at the second viewer node, and relaying signaling packets received from the second viewer node to the content streaming server via the spoofed TCP socket.

8. The communication node of claim 1, wherein the operations further comprise:
obtaining, via a third streaming session between the communication node and the content streaming server, content data associated with the content.

9. The communication node of claim 8, wherein the third streaming session comprises a transport layer connection between the content streaming server and the communication node.

10. A non-transitory machine-readable storage medium, comprising executable instructions that, when executed by a processing system of a communication node including a processor, facilitate performance of operations, comprising:
detecting, during streaming of content in a first intercepted streaming session from a content streaming server to a first viewer node an instruction to stream the content to a second viewer node;
intercepting a transport layer connection between the content streaming server and the second viewer node to create a second intercepted streaming session;
receiving from the content streaming server a control packet to mark a first content item needed by the second viewer node for transport of content data to the second viewer node;
receiving the content data and replicating the content data, resulting in replicated content data; and
synchronously injecting the replicated content data into the first intercepted streaming session for the first viewer node and the second intercepted streaming session for the second viewer node, wherein the injecting the replicated content data comprises beginning injection of the replicated content data into the second intercepted streaming session according to the control packet.

11. The non-transitory machine-readable storage medium of claim 10, wherein the operations further comprise:
intercepting the first intercepted streaming session from the content streaming server to the first viewer node, wherein the first intercepted streaming session comprises a transport layer connection between the content streaming server and the first viewer node.

12. The non-transitory machine-readable storage medium of claim 10, wherein the injecting the replicated content data comprises:
beginning injection of the replicated content data into the first intercepted streaming session and the second intercepted streaming session according to the control packet.

13. The non-transitory machine-readable storage medium of claim 10, wherein the receiving a control packet comprises receiving a first control packet and receiving a second control packet, and wherein the beginning injection of the replicated content data comprises injecting the first control packet to mark a first packet needed by the first viewer node and injecting the second control packet to mark a time to begin injecting the replicated content data.

14. The non-transitory machine-readable storage medium of claim 13, wherein the content comprises video and wherein the first packet contains content data comprising an i-frame.

15. The non-transitory machine-readable storage medium of claim 10, wherein the operations further comprise:
receiving the content data via a transport layer connection between the communication node and the content streaming server.

16. The non-transitory machine-readable storage medium of claim 10, wherein the operations further comprise:
creating a spoofed transport control protocol (TCP) socket that faces the second viewer node, the spoofed TCP socket matching an existing socket at the content streaming server, and injecting the replicated content data into the second intercepted streaming session via the spoofed TCP socket.

17. The non-transitory machine-readable storage medium of claim 10, wherein the operations further comprise:
creating a spoofed transport control protocol (TCP) socket that faces the content streaming server, the spoofed TCP socket matching an existing socket at the second viewer node, and relaying signaling packets received from the second viewer node to the content streaming server via the spoofed TCP socket.

18. A method, comprising:
intercepting, by a processing system of a communication node comprising a processor, a first streaming session between a content streaming server and a first viewer node, the first streaming session including content data streamed from the content streaming server to the first viewer node;
responsive to an instruction to stream the content data to a second viewer node, intercepting a second streaming session between the content streaming server and the second viewer node;
receiving, from the content streaming server, control data, wherein the control data marks a first content item needed by the second viewer node for transport of content data to the second viewer node;
replicating the content data, resulting in replicated content data; and
injecting the replicated content data into the first streaming session and the second streaming session to synchronously provide the replicated content data to both the first viewer node and the second viewer node, wherein the injecting the replicated content data comprises beginning injection of the replicated content data into the second streaming session according to the control data.

19. The method of claim 18, wherein the injecting the replicated content data comprises beginning injection of the replicated content data into the first streaming session and the second streaming session according to the control data.

20. The method of claim 19, wherein the receiving control data comprises receiving a first control packet and receiving a second control packet, and wherein the beginning injection of the replicated content data comprises injecting the first control packet to mark a first packet needed by the first viewer node and injecting the second control packet to mark a time to begin injecting the replicated content data.

* * * * *